(12) United States Patent
Kong et al.

(10) Patent No.: US 7,440,626 B2
(45) Date of Patent: Oct. 21, 2008

(54) IMAGE TRANSCODING

(75) Inventors: Hao-Song Kong, Newton, MA (US);
Anthony Vetro, Cambridge, MA (US);
Toshihiko Hata, Hyogo (JP); Naoki Kuwahara, Hyogo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 732 days.

(21) Appl. No.: 11/002,817

(22) Filed: Dec. 2, 2004

(65) Prior Publication Data
US 2006/0120610 A1 Jun. 8, 2006

(51) Int. Cl.
*G06K 9/36* (2006.01)
(52) U.S. Cl. .................................... 382/232
(58) Field of Classification Search ......... 382/232–233, 382/239–240; 341/50, 51, 60; 375/240.11, 375/240.25, 240.27, E7.198
See application file for complete search history.

(56) References Cited

U.S. PATENT DOCUMENTS

| | | | |
|---|---|---|---|
| 6,553,150 B1 * | 4/2003 | Wee et al. | 382/243 |
| 6,661,927 B1 * | 12/2003 | Suarez et al. | 382/240 |
| 7,116,833 B2 * | 10/2006 | Brower et al. | 382/240 |
| 7,206,804 B1 * | 4/2007 | Deshpande et al. | 709/203 |

OTHER PUBLICATIONS

Wang et al., "Bitplane-by-bitplane shift (BbBShift)—A suggestion for JPEG 2000 Region of Interest image coding," IEEE Signal Processing Letters, vol. 9, No. 5, May 2002.
Skodras et al., "The JPEG 2000 still image compression standard," IEEE Signal Processing Magazine, Sep. 2001.
Liu et al., "A new JPEG 2000 region-of-interest image coding method: partial significant bitplanes shift," IEEE Signal Processing Letters, vol. 10, No. 2, Feb. 2003.
Rosenbaum et al., "Flexible, dynamic and compliant region of interest coding in JPEG 2000," IEEE Proceeding of ICIP, Rochester, New York, Sep. 2002.

* cited by examiner

*Primary Examiner*—Jose L Couso
(74) *Attorney, Agent, or Firm*—Dirk Brinkman; Clifton D. Mueller; Gene V. Vinokur (57) ABSTRACT

A method transcodes an image in the form of an encoded input bitstream. The input bitstream includes quality layers, each quality layer includes a resolution levels, each resolution level includes components, each component includes precincts, and each precinct includes a packet partition location, a header length, and a body length. The input bitstream is decoded partially to obtain a structure of the encoded input bitstream. Coordinates of a region-of-interest in the image are specified, and progressive parameters are defined. The partially decoded input bitstream is then encoded according to the structure, the coordinates, and the progressive parameters to obtain an encoded output bitstream.

16 Claims, 9 Drawing Sheets

IMAGE TRANSCODING

FIELD OF THE INVENTION

The invention relates generally to image and video coding, and more particularly to transcoding images including a region-of-interest.

BACKGROUND OF THE INVENTION

Video surveillance, cellular telephones, digital cameras, printers, scanners, facsimile, copiers, medical imaging, satellite imaging, the Internet, and compound documents, have increased the demand for image and video applications. However, due to limited resources, such as bandwidth, storage and processors, high quality images are often not possible. The quality of an image depends on the number of pixels in the image, and the number of bits that are allocated to each pixel. For example, a 1024×1024 pixels images with 24 bits for each pixel will be a 25 Mb high quality color image, while a 10×10 pixel image with 1 bit per pixel will be a 100 bit low quality black and white 'thumbnail' image.

One solution distinguishes a region-of-interest (ROI) in an image from the background (BG). More bits are used to encode the ROI than the BG. By allocating more bits to the ROI than the BG, the total number of bits used to encode the image can be reduced without decreasing the perceived resolution and quality of the ROI in the encoded image. Fewer bits reduce the required resources.

One ROI encoding method selectively scales up wavelet transformed coefficients for ROIs, Atsumi, et al., "*Lossy/lossless region-of-interest image coding based on set partitioning in hierarchical trees*," IEEE Proceeding of ICIP, October 1998. The ROIs are also transferred at a higher priority. However, depending on the scaling value, the ROIs can appear to blend into the BG. Therefore, the decoder also needs shape information to distinguish the ROIs from the BG.

The JPEG 2000 standard defines a max-shift method for ROI encoding, ISO/IEC 15444-1, "*Information technology—JPEGH 2000 image coding system—Part 1: Core coding system*," 1$^{st}$ Ed., 2000. The JPEG 2000 standard uses color conversion, quantization, wavelet transform, progressive bit-plane coding, and entropy coding. The encoded images are transferred as a layered stream of packets. With JPEG 2000, the size and quality of the output image is selected during the encoding. The max-shift method separates the ROI from the background by scaling the ROI into non-overlapping bit planes, Skodras et al., "*The JPEG 2000 still image compression standard*," IEEE Signal Processing Magazine, September, 2001. The scaling value is sufficiently large to ensure that the minimum coefficient associated with the ROI is larger than the maximum coefficient of the background. When the decoder receives the scaling value, the decoder identifies the ROI coefficients by their magnitudes. The max-shift method enables the encoding of ROIs with arbitrary shapes without explicitly transmitting the shape information of the ROI to the decoder. However, max-shift encoding increases overhead due to extra code blocks that are required to define the boundaries of the ROI.

Another method shifts bits on a plane-by-plane basis to adjust for the relative importance of the ROI, Wang et al., "*Bitplane-by-bitplane shift (BbBShift)—A suggestion for JPEG 2000 Region of Interest image coding*," IEEE Signal Processing Letters, Vol. 9, No. 5, May 2002. However, the BbBShift method is not compatible with the JPEG 2000 standard.

Another method is named a "partial significant bit-planes shift" (PSBShift), Liu et al., "*A new JPEG 2000 region-of-interest image coding method: partial significant bitplanes shift*," IEEE Signal Processing Letters, Vol. 10, No. 2, February 2003. The PSBShift method tries to sustain a high quality for ROIs. The BbBShift method is also incompatible with JPEG 2000 standard.

All of the above ROI encoding methods use static coding. That is, the ROI is defined during the encoding. That is a problem when the ROI information is only available during decoding. For example, the viewer desires to specify the ROI. That is also a problem if the ROI information is supplied dynamically by an external source. For example, an external process, such as object tracking, analyzes the images before the decoding, and determines the ROIs.

A dynamic ROI coding method is described by Rosenbaum et al., "*Flexible, dynamic and compliant region of interest coding in JPEG* 2000," IEEE Proceeding of ICIP, Rochester, N.Y., September, 2002. That method handles dynamic ROI information in an interactive environment. That method uses a precinct/layer mechanism, as defined by the JPEG 2000 standard, to arrange the precinct priority in each layer. That method dynamically inserts layers. ROI packets remain in the same layer, while other packets are shifted up one layer. However, dynamic layer insertion requires recoding of the packet header. This requires rate-distortion recalculation, which is an undesirable feature for real-time image transmission applications. Furthermore, that method is compatible with the JPEG 2000 standard.

Therefore, due to the problems of the prior art encoding methods, it is desired to provide a new encoding mechanism that avoids re-encoding of the packet header and that makes the ROI coding flexible and dynamic, and with a low computational complexity.

SUMMARY OF THE INVENTION

A method transcodes an image or video in the form of an encoded input bitstream. The input bitstream, in the form of packets, includes quality layers, each quality layer includes resolution levels, each resolution level includes components, each component includes precincts, and each precinct includes a packet partition location, a header length, and a body length.

The input bitstream is decoded partially to obtain an indexed structure of the encoded input bitstream. Coordinates of a region-of-interest in the image are specified, and progressive parameters are defined.

The partially decoded input bitstream is then encoded according to the structure, the coordinates, and the progressive parameters to obtain an encoded output bitstream.

During the transcoding, region-of-interest and background packets in the input bitstream are selectively converted to the output bitstream according the progressive parameters. For example, no background packets are included in the output bitstream, or only the region-of-interest and background packets from low quality layers.

DETAILED DESCRIPTION OF THE PREFERRED EMBODIMENT

Figure 1:
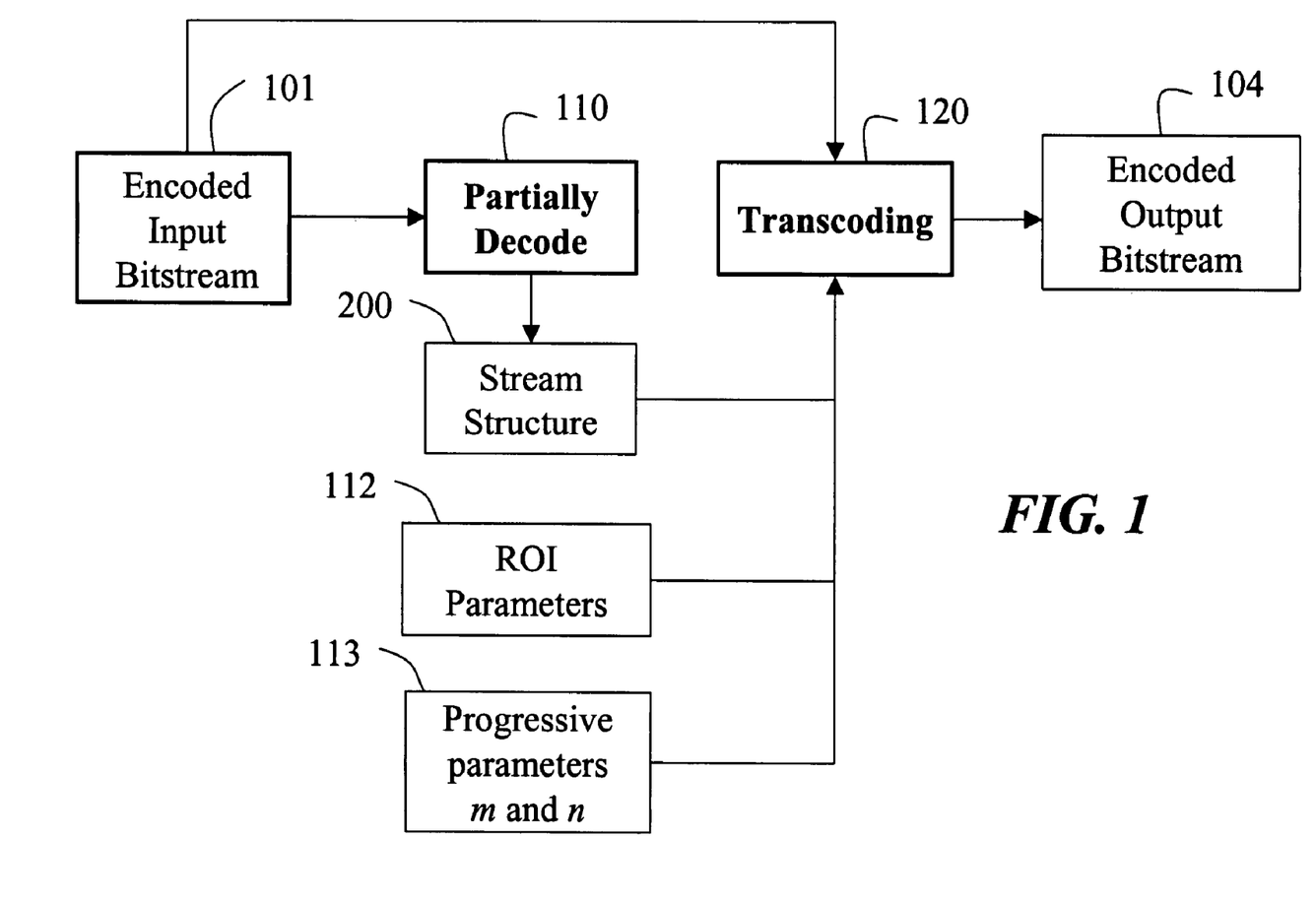
FIG. 1 is a block diagram of a system and method for transcoding images according to the invention.

FIG. 1 shows a system and method according to our invention for transcoding an image including a region-of-interest (ROI). The ROI is a rectangular area in the image. Input to our system is an encoded bitstream 101, e.g., a JPEG 2000 bitstream. The bitstream is in the form of a sequence of data packets. The images can be compressed using lossy or lossless techniques.

During encoding of the bitstream 101, a wavelet transform is employed in the JPEG 2000 standard to analyze the image as four sub-band images. The sub-band images include coefficients that describe different spatial frequency characteristics of the sub-band images. A lowest frequency sub-band image is further decomposed into four smaller sub-bands. This process can be repeated, as needed, for a desired image resolution. Each sub-band image is partitioned into non-overlapping rectangular blocks, called 'code-blocks'. Each code-block is independently coded into the final encoded bitstream 101.

In order to efficiently organize the bitstream, code-blocks are grouped into 'precincts' within each resolution level. Precinct partitioning makes it easier to access the wavelet coefficients corresponding to a particular spatial region of the image. Each precinct generates one packet in the bitstream. To enable SNR-progressive refinement, the information contained in a packet is distributed across multiple layers. Each layer contains a certain amount of data from the considered precincts.

In order to extract the desired packets from each quality layer and each resolution level in the bitstream, our invention provides a parser 110 that partially decodes packet header information without performing arithmetic decoding for code-blocks. This allows ROI transcoding 120 to produce an encoded output bitstream 104, with minimal computational complexity.

Figure 2:
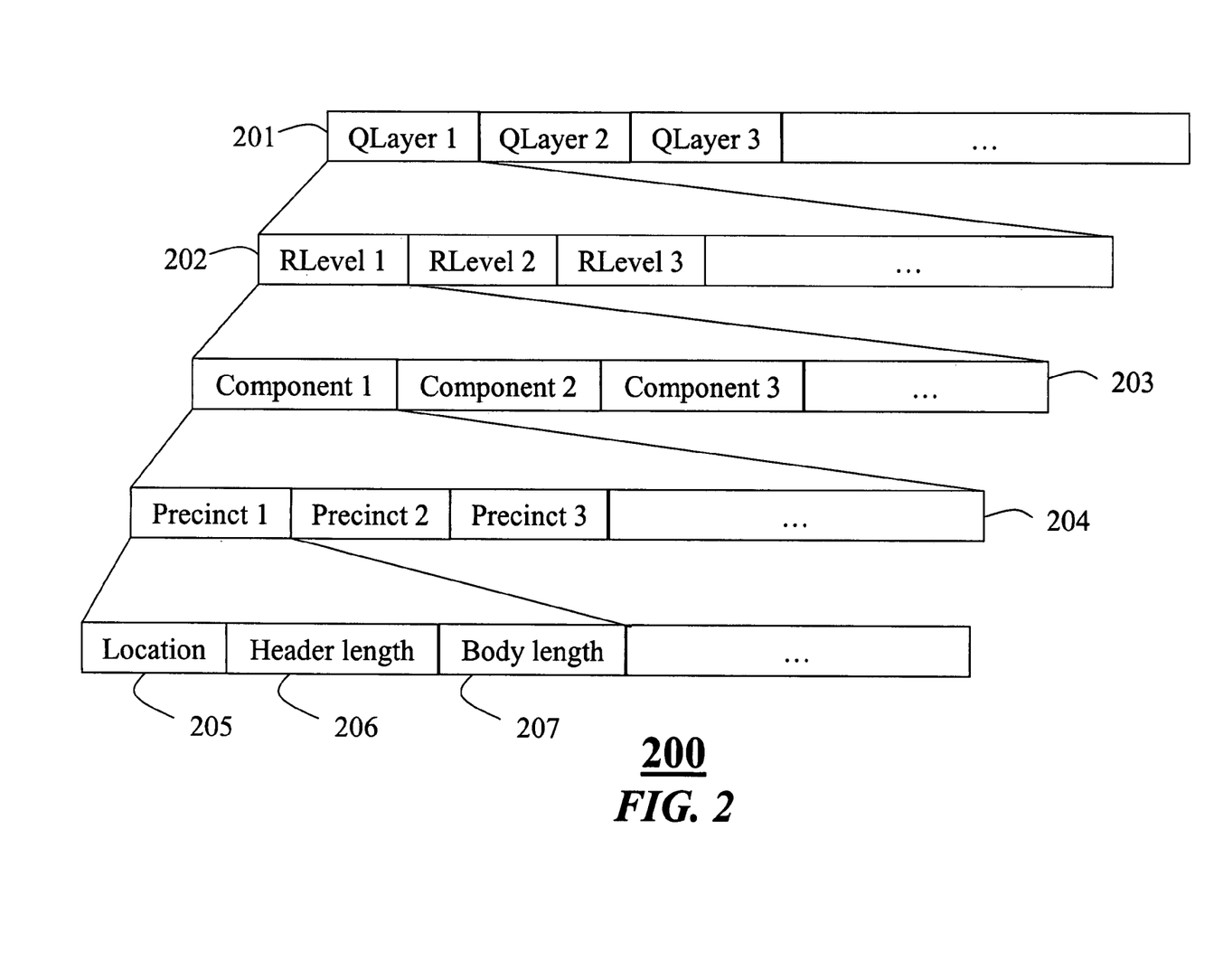
FIG. 2 is a block diagram of a structure of a layered bitstream according to the invention.

As shown in FIG. 2, the parser 110 uses a tag-tree decoder to obtain the hierarchical data structure 200 of the input bitstream.

The packets in the bitstream 101 are partially decoded 110 to obtain the structure 200. The hierarchical structure includes quality layers (Qlayer n) 201, each layer including resolution levels (Rlevel m) 202, each resolution level including components 203, each component including precincts 204, and each precinct including a packet partition location 205, a header length 206, and a body length 207. The index numbers enable direct access to the precinct information 205-207.

Due to the complex architecture of JPEG 200 bitstream, it is costly to access every precinct. Therefore, we design the data structure 200 so that it can be randomly and directly accessed by index numbers.

As shown in FIG. 1, ROI coordinates 112 and progressive parameters 113 are also specified and defined, e.g., by a user or an external source.

The structure 200, ROI coordinates 112, and the progressive parameters 113 are passed to the transcoder 120. In contrast with the prior art, the ROI coordinates 112 are specified during the transcoding, instead of during the encoding. For example, a user marks the ROI, or the coordinates are supplied by other techniques, such as object or pattern recognition. The recognizer locates an object or pattern in the image, and fits the ROI around the object to obtain the coordinates.

The ROI coordinates may not match the precinct locations. In this case, the transcoding 120 rounds the ROI coordinates outward to the nearest precinct boundaries. That is, the rectangular ROI is made larger to fit the boundaries defined by the precincts. The progressive parameters can also be defined by the user before the transcoding to indicate if the background (BG) can be deleted, or to indicate how many quality levels that need to be transcoded for the BG and ROI. The use of the progressive parameters is described below.

The transcoder uses the structure information 200 and the coordinates 112 to identify BG and ROI packets in the input bitstream 101. The packets are reorganized into packets of the encoded output bitstream 104 according to the ROI coordinates 112 and the progressive parameters 113. The final encoded output bitstream 104 is fully complied with the JPEG 2000 standard.

Figure 3:
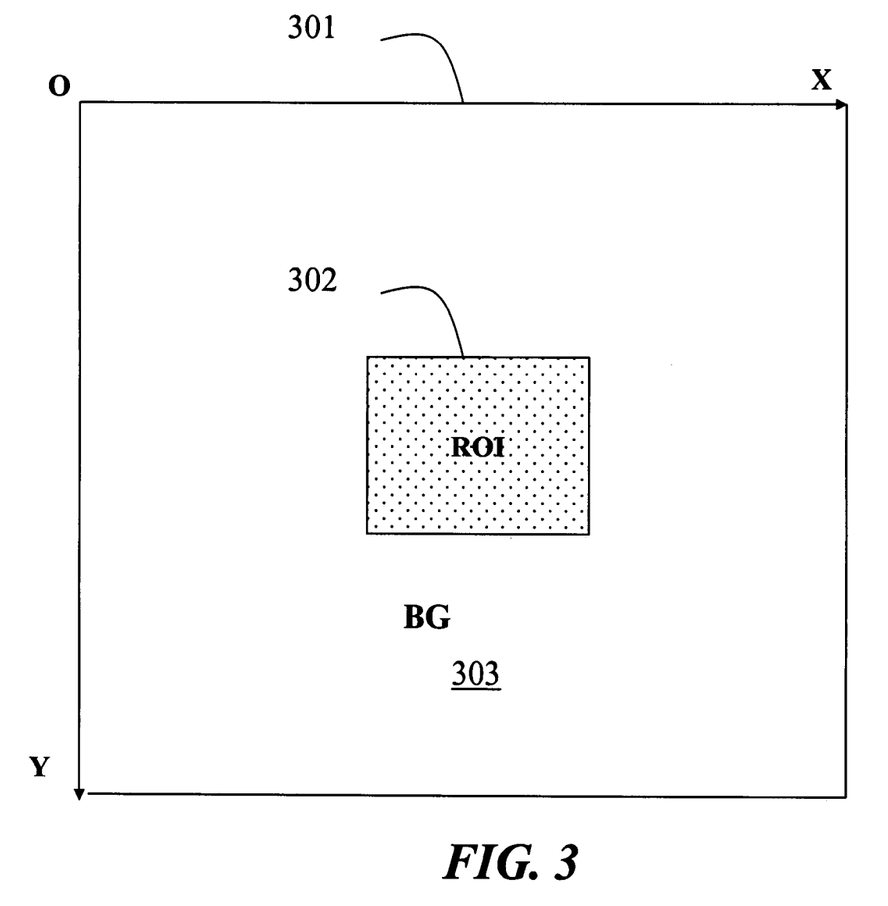
FIG. 3 is a block diagram of an image including a region-of-interest according to the invention.

FIG. 3 shows an example image 301 including an ROI 302, and the remaining background (BG) 303. The coordinates of the ROI are defined with respect to an origin (O), and an X-axis and Y-axis.

Figure 4:
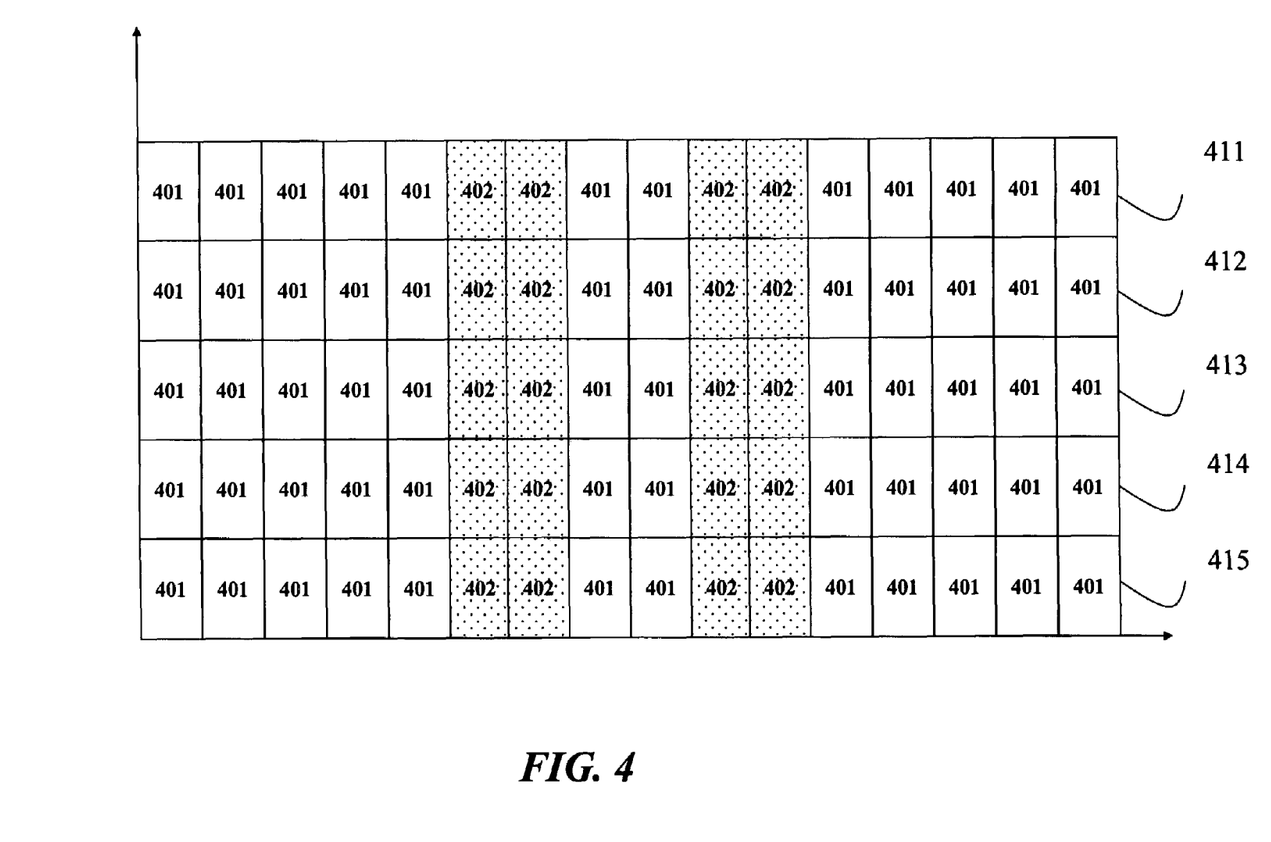
FIG. 4 is a block diagram of layered packets to be transcoded according to the invention.

As shown in FIG. 4, the image 301 is encoded into BG packets 401 and ROI packets 402 of five 'quality' layers 411-415 of the bitstream 101.

Figure 5:
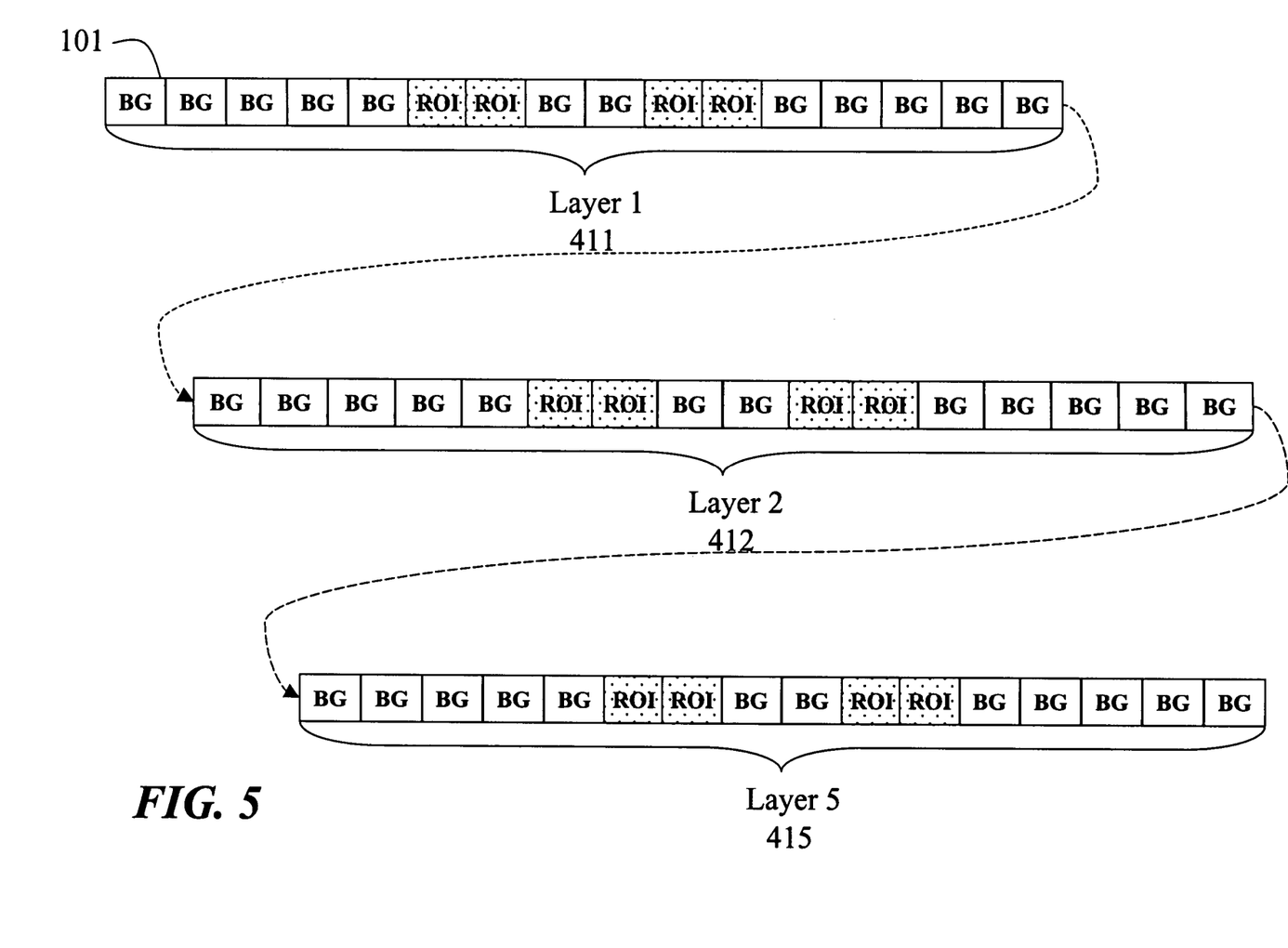
FIG. 5 is a block diagram of an input bitstream according to the invention.

FIG. 5 shows the arrangement of the ROI and BG packets in the five layers 411-415 of the bitstream 101 with so called "layer-resolution-component-position (LRCP) progression for a single resolution level and one component.

Figure 6:
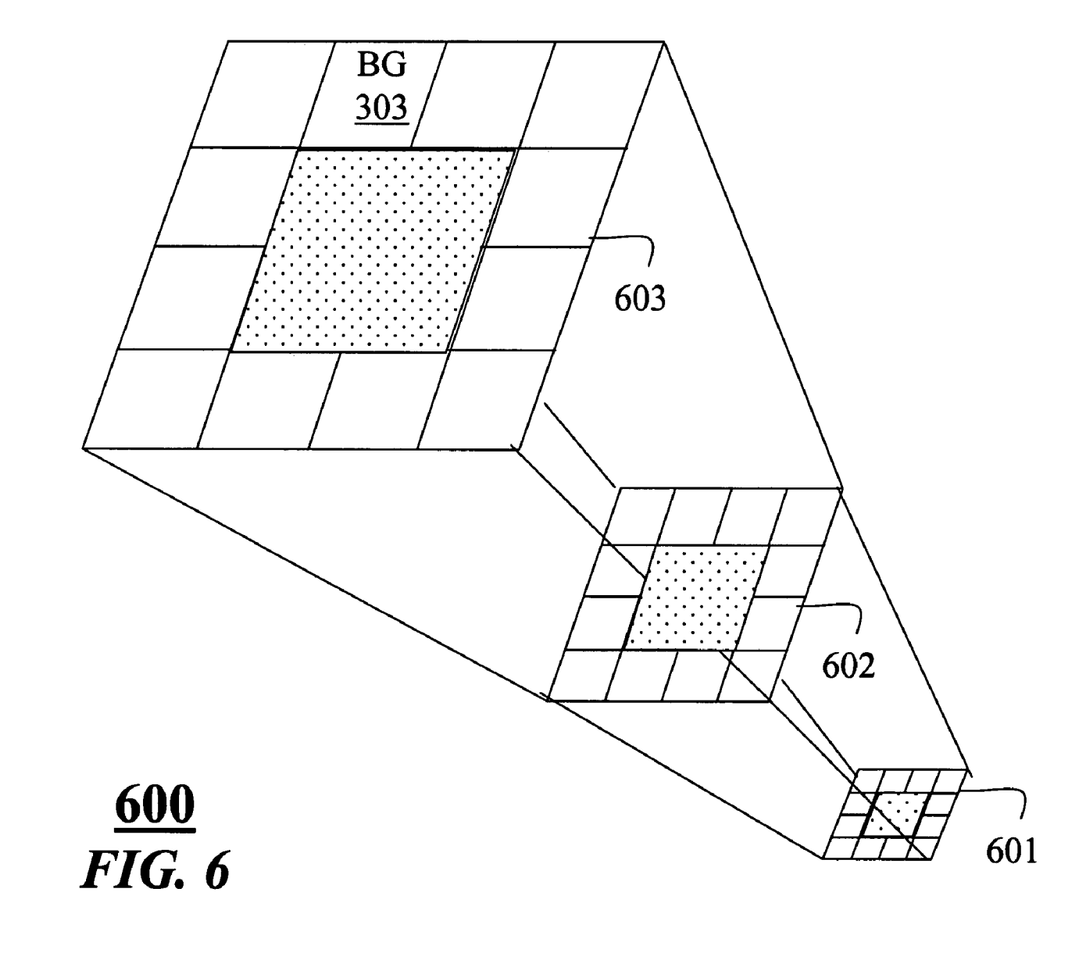
FIG. 6 is a block diagram of resolution levels according to the invention.

FIG. 6 shows resolution map 600 with three levels 601-603. A precinct describes a spatial region in the image at a specific resolution level. In the decomposition according to JPEG 2000, the precinct size in each direction is a power of two. The image area on the high-resolution level is propagated to the next lower resolution level by dividing by two. This procedure is repeated for each resolution level.

Figure 7:
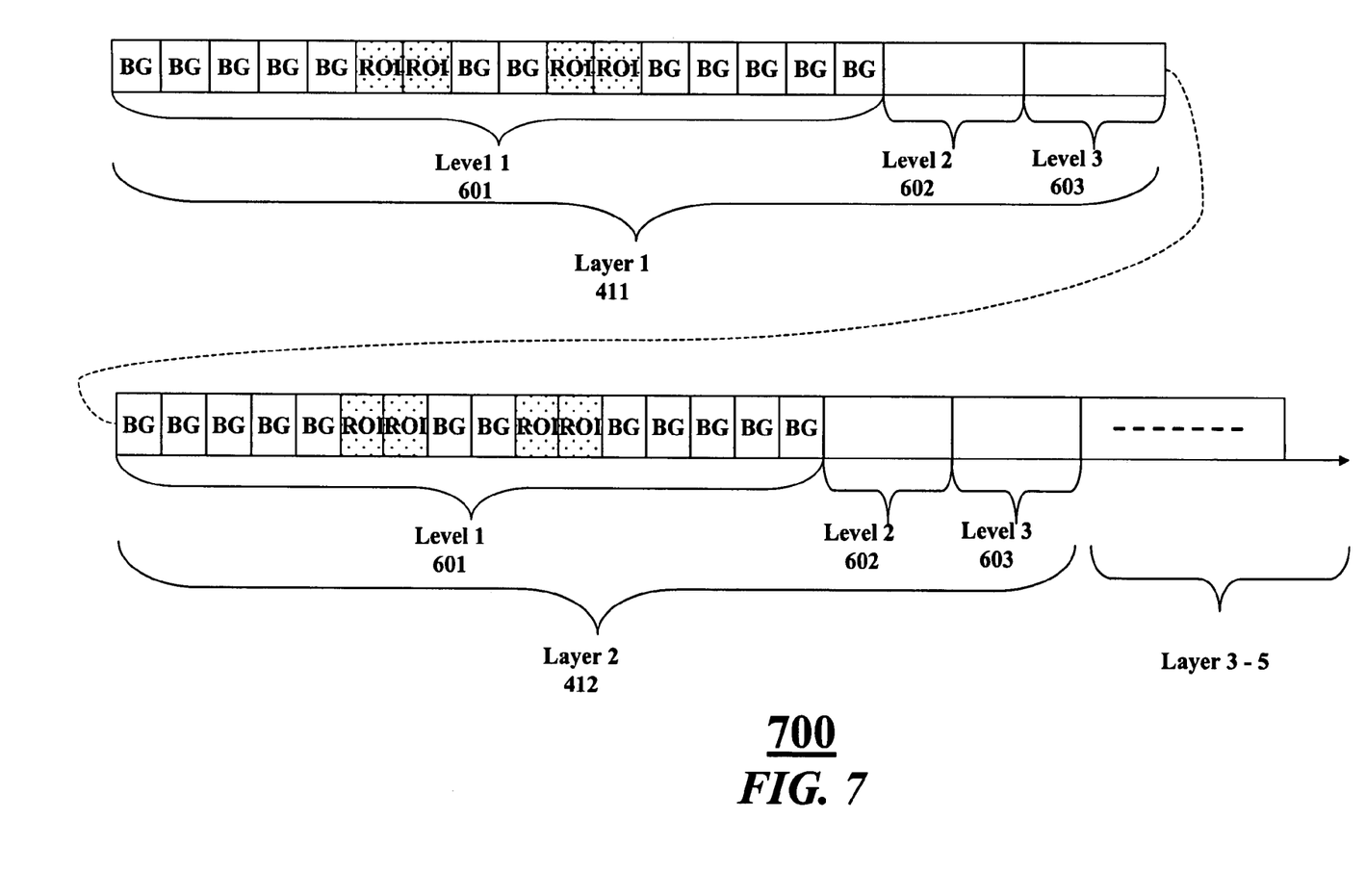
FIG. 7 is a block diagram of a bitstream corresponding to the resolution levels of FIG. 6.

FIG. 7 shows the corresponding bitstream 700 with LRCP progression. From FIG. 7, it is known that the resulting packets contain information about a specific region of an image at a given resolution level.

In order to extract the desired ROI and specify the scalable quality for the BG and the ROI, the transcoder 120 uses two progressive parameters m and n. The parameter m specifies a desired 'quality' of the BG 303, and the parameter n specifies a desired quality of the ROI 302. The parameters m and n have the following constraints:

for the ROI, $0 \leq m < n \leq$ maximum quality, otherwise for the background, $0 \leq m \leq$ the maximum quality, and for no background, m=0.

Under the last constraint, the entire background is converted to empty packets, and only the ROI packets are transcoded. An empty packet has a one-byte packet header, with the first bit set to zero, and no payload. This case greatly reduces bandwidth requirements for the transcoded output bitstream.

For ROI packets, the transcoder 120 extracts only the ROI packet from the lowest quality layer 1, to quality layer n from the input bitstream and encodes these packets in the output bitstream. The ROI packets from layers greater than n are converted to empty packets in the encoded output bitstream.

For the BG packets, if m=0, then all BG packets are converted to the empty packets. If m>0, then the transcoder 120 extracts BG packets from the lowest quality 1, to quality layer m in the input bitstream and encodes these packets in the output bitstream. The BG packets on layers higher than m are all converted to the empty packets in the output bitstream.

Through different combinations of the parameters m and n, various quality progressive results can be achieved for the ROI and the BG. The user can take advantage of this feature to make adjustments between visual perception requirements and communication bandwidth capacity.

Figure 8:
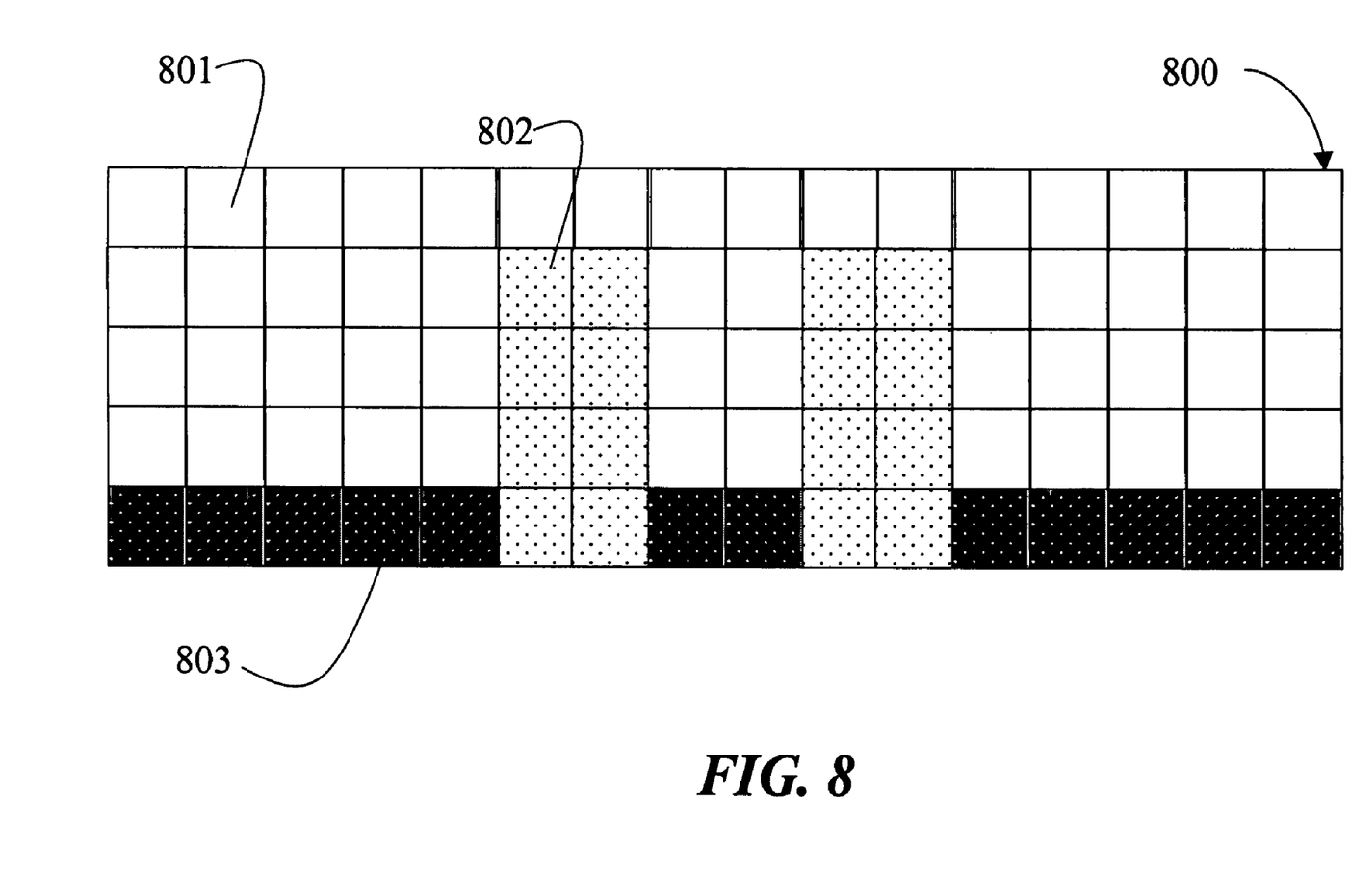
FIG. 8 is a block diagram of an image to be transcoded according to the invention.

FIG. 8 shows an example image 800 to be transcoded with progressive parameters m=1 and n=4. The image 800 has empty packets 801, ROI packets 802, and BG packets 802.

Figure 9:
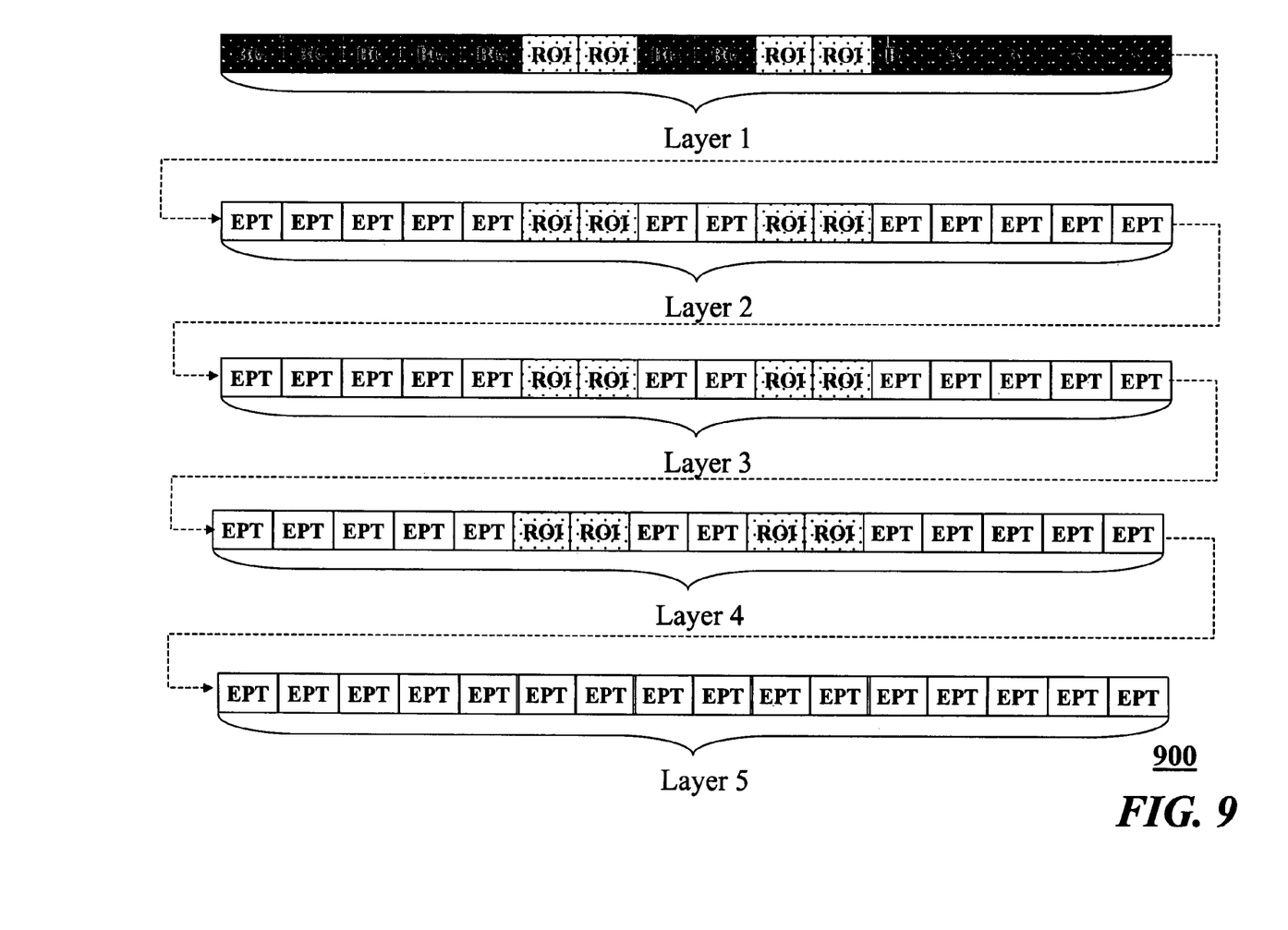
FIG. 9 is a block diagram of an output bitstream according to the invention.

FIG. 9 shows the packets of the corresponding output bitstream 900.

EFFECT OF THE INVENTION

The invention enables recovery of an image from an encoded bitstream in any number of different ways with any desired spatial resolution and image quality. The transcoding according to the invention is adaptive and scalable. The invention can retain a high quality and high resolution for regions-of-interest. Remaining portions of the image can have reduced quality or be deleted entirely to achieve a desired bandwidth. The method according to the invention has a lower complexity and increased efficiency when compared with prior art methods.

Unlike the prior art, the invention does not fully decode and reencode packets. Instead, the invention selectively deletes packets or uses empty packets to effectively increase a priority of the ROI, which enables real-time transcoding applications.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for scalable image transcoding, comprising;
    decoding partially an encoded input bitstream of an image to obtain a structure of the encoded input bitstream, in which the encoded input bitstream includes a plurality of quality layers, each quality layer includes a plurality of resolution levels, each resolution level including a plurality of components, each component including a plurality of precincts, and each precinct including a packet partition location, a header length, and a body length;
    specifying coordinates of a region-of-interest in the image, in which a progressive parameter m specifies a quality a background of the image, and a parameter n specifies a quality of the ROI;
    constraining the progressive parameters m and n according to:
        for the region-of-interest,
            $0 \leq m < n \leq$ maximum quality, otherwise
        for the background,
            $0 \leq m \leq$ the maximum quality, and
        for no background,
            m=0;
    defining progressive parameters; and
    encoding the partially decoded input bitstream according to the structure, the coordinates, and the progressive parameters, as an encoded output bitstream.

2. The method of claim 1, in which the encoded input bitstream and the encoded output bitstream are both a JPEG 2000 bitstream.

3. The method of claim 1, further comprising:
    indexing the precincts using index numbers.

4. The method of claim 3, further comprising:
    accessing the structure randomly using the index numbers during the encoding.

5. The method of claim 3, further comprising:
    accessing the structure directly using the index numbers during the encoding.

6. The method of claim 1, further comprising:
    defining the coordinates by a user while transcoding.

7. The method of claim 1, further comprising:
    defining the coordinates by an external source while transcoding.

8. The method of claim 7, in which the external source uses object recognition to determine the parameters of the region-of-interest.

9. The method of claim 7, in which the external source uses pattern recognition to determine the parameters of the region-of-interest.

10. The method of claim 1, further comprising:
    rounding the parameters outwards to nearest boundaries of the plurality of precincts.

11. The method of claim 1, further comprising:
    specifying the progressive parameters by a user while transcoding.

12. The method of claim 1, in which the encoded input bitstream includes region-of-interest packets and background packets, and further comprising:
    converting all background packets to empty packets in the encoded output bitstream if m=0, in which an empty packet has a one byte packet header, with a first bit set to zero, and no payload.

13. The method of claim 12, further comprising:
    extracting, for the region-of-interest packets, only region-of-interest packets from a lowest quality layer 1 to a quality layer n and encoding the extracted region-of-interest packets in the encoded output bitstream, and converting all other region-of-interest packets to empty packets in the encoded output bitstream; and
    extracting, for the background packets, only background packets from the lowest quality layer 1 to a quality layer m and encoding the extracted background packets in the encoded output bitstream, and converting all other background packets to empty packets in the encoded output bitstream.

14. The method of claim 1, in which the encoded input bitstream is a video including a plurality of images, and the decoding, specifying, defining and encoding steps are performed for each image.

15. The method of claim 1, in which the encoded input bitstream includes a plurality of packets, and the decoding is applied only on headers of the packets.

16. The method of claim 1, in which the progressive parameters are specified to meet a desired image quality and bandwidth usage.

* * * * *